(12) United States Patent
Takabayashi (10) Patent No.: US 10,909,404 B2
(45) Date of Patent: Feb. 2, 2021

(54) IMAGE PROCESSING DEVICE AND IMAGE PROCESSING METHOD

(71) Applicant: SEIKO EPSON CORPORATION, Tokyo (JP)

(72) Inventor: Nobuhisa Takabayashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 44 days.

(21) Appl. No.: 16/298,627

(22) Filed: Mar. 11, 2019

(65) Prior Publication Data

US 2019/0279016 A1    Sep. 12, 2019

(30) Foreign Application Priority Data

Mar. 12, 2018  (JP) ................................. 2018-043850

(51) Int. Cl.
| | | |
|---|---|---|
| G06K 9/00 | (2006.01) | |
| G06K 9/32 | (2006.01) | |
| G06K 9/20 | (2006.01) | |
| G06K 9/42 | (2006.01) | |

(52) U.S. Cl.
CPC ....... *G06K 9/3233* (2013.01); *G06K 9/00449* (2013.01); *G06K 9/00463* (2013.01); *G06K 9/2054* (2013.01); *G06K 9/42* (2013.01); *G06K 2209/01* (2013.01); *G06K 2209/011* (2013.01)

(58) Field of Classification Search
CPC ............. G06K 2209/01; G06K 9/2054; G06K 7/10762; G06K 7/1465; G07G 1/0081
USPC ................. 382/181, 182; 235/383, 380, 437, 235/462.11, 494; 705/16, 24; 380/51, 380/55; 283/72, 73, 82
See application file for complete search history.

(56) References Cited

U.S. PATENT DOCUMENTS

| | | | |
|---|---|---|---|
| 5,613,016 A | 3/1997 | Saitoh | |
| 6,011,879 A | 1/2000 | Nemoto et al. | |
| 8,678,280 B2 * | 3/2014 | Suzuki | ............... G06K 7/10762 235/380 |

FOREIGN PATENT DOCUMENTS

| | | |
|---|---|---|
| EP | 2 154 632 A2 | 2/2010 |
| JP | 2017-174309 A | 9/2017 |
| WO | WO-91/08553 A2 | 6/1991 |

OTHER PUBLICATIONS

Extended European Search Report dated Aug. 26, 2019 in related European Appl. 19162320.6 (10 pgs.).
Liu et al., "Aspect Ratio Adaptive Normalization for Handwritten Character Recognition," Advances in Multimodal Interfaces, 2000, pp. 418-425.

* cited by examiner

*Primary Examiner* — Charlotte M Baker
(74) *Attorney, Agent, or Firm* — Chip Law Group (57) ABSTRACT

An image processing device includes an acquisition unit that acquires a read image generated by reading a receipt or a bill and including a special character having a size different from a basic size of a character, a conversion unit that performs conversion processing on the size of the special character included in the read image into a size close to the basic size, and a character recognition unit that performs character recognition processing on the conversion-processed read image.

6 Claims, 8 Drawing Sheets

| | | IM |
|---|---|---|
| CL1 | 郵便物別受合計通数 | 3通 |
| CL2 | 課税計 | ¥1,200 |
| CL3 | (内消費税等 | ¥88) |
| CL4 | 非課税計 | ¥0 |
| CL5 | 合計 | ¥1,200 |
| CL6 | お預り金額 | ¥2,000 |
| CL7 | おつり | ¥800 |

IMAGE PROCESSING DEVICE AND IMAGE PROCESSING METHOD

BACKGROUND

1. Technical Field

The present invention relates to an image processing device, an image processing method, and an image processing program for performing character recognition processing.

2. Related Art

A technology in which a receipt, a slip, or the like is imaged and printed information is extracted using optical character recognition is known (refer to JP-A-2017-174309).

When reading the characters printed on the receipt or the like, for some characters having special sizes, there is a problem in that a correct result of character recognition cannot be obtained using the character recognition processing.

SUMMARY

According to an aspect of the invention, an image processing device includes an acquisition unit that acquires a read image generated by reading a receipt or a bill and including a special character having a size different from a basic size of a character, a conversion unit that converts the size of the special character included in the read image into a size close to the basic size, and a character recognition unit that performs character recognition processing on the conversion-processed read image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. Each drawing is merely an example for explaining the embodiments.

1. Overall Description of System

Figure 1:
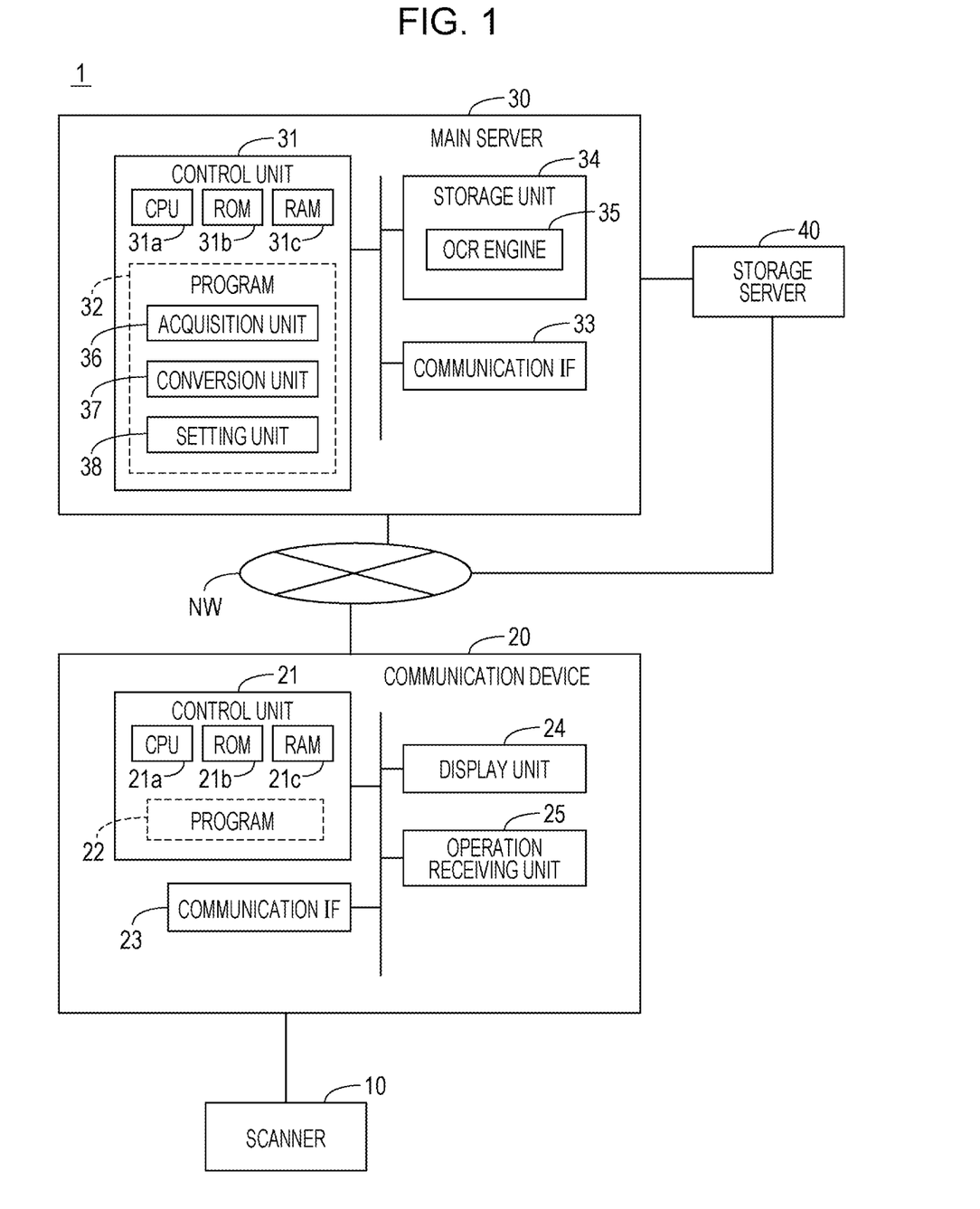
FIG. 1 is a diagram simply illustrating a configuration of a system.

FIG. 1 simply illustrates a configuration of a system 1 according to the present embodiment. The system 1 includes a scanner 10, a communication device 20, a main server 30, and a storage server 40. The main server 30 and the storage server 40 are servers capable of providing cloud services to users through the Internet communication network.

The scanner 10 is a reading device capable of optically reading an original document, generating image data of a predetermined format as a result of reading, and outputting the image data to the outside. The scanner 10 may be a multifunction device having a plurality of functions such as a printing function and a facsimile communication function in addition to the function as a scanner. The scanner 10 is connected to the communication device 20 so as to be able to wired or wirelessly communicate with the communication device 20, and transmits the image data to the communication device 20.

The communication device 20 is realized by, for example, a personal computer (PC), a smartphone, a tablet type terminal, a cellular phone, or an information processing device having processing capability similar to those. The communication device 20 includes a control unit 21, a communication interface (IF) 23, a display unit 24, an operation receiving unit 25, and the like. The control unit 21 is configured to include one or a plurality of ICs including a CPU 21a as a processor, a ROM 21b, a RAM 21c, and the like, and other memories.

The control unit 21 controls the communication device 20 by the processor (the CPU 21a) performs arithmetic processing according to a program stored in the memory or the like other than the ROM 21b and the ROM 21b using the RAM 21c or the like as a work area. The control unit 21 has a program 22 as one of the programs. The program 22 is an application for uploading the image data generated by the scanner 10 by reading the original document to the main server 30.

The communication IF 23 is a generic term for one or a plurality of IFs for the communication device 20 to perform communication with the outside either wired or wirelessly in accordance with a predetermined communication protocol including a known communication standard. The communication device 20 is not only connected to the scanner 10 but also connected to a network NW via the communication IF 23. The network NW includes a local area network (LAN), the Internet communication network, other public lines, and the like.

The display unit 24 is means for displaying visual information, and is configured with, for example, a liquid crystal display (LCD), an organic EL display or the like. The display unit 24 may be configured to include the display and a drive circuit for driving the display. The operation receiving unit 25 is means for receiving an operation by a user, and is realized by, for example, a physical button, a touch panel, a mouse, a keyboard, or the like. Of course, the touch panel may be realized as one function of the display unit 24. The display unit 24 and the operation receiving unit 25 may be collectively referred to as an operation panel of the communication device 20.

The scanner 10 and the communication device 20 may be devices independent from each other as illustrated in FIG. 1, but in reality all of them may be included in one device. Specifically, by including the configuration of the communication device 20, the scanner 10 may be realized as a multifunction device having a communication function with the outside via the network NW.

The main server 30 is realized by one or a plurality of information processing devices functioning as a server on the network NW. The main server 30 includes a control unit 31, a communication IF 33, a storage unit 34, and the like. The control unit 31 is configured to include one or a plurality of ICs including a CPU 31a as a processor, a ROM 31b, a RAM 31c, and the like, and other memories. The control unit 31 controls the main server 30 by the processor (the CPU 31a) performs arithmetic processing according to a program stored in the memory or the like other than the ROM 31b and the storage unit 34 using the RAM 31c or the like as a work area. The control unit 31 has a program 32 as one of the programs. The program 32 corresponds to the image processing program executed by the control unit 31 of the main server 30. In addition, the main server 30 that executes the program 32 corresponds to a specific example of image processing device.

The communication IF 33 is a generic term for one or a plurality of IFs for the main server 30 to perform communication with the outside either wired or wirelessly in accordance with a predetermined communication protocol including a known communication standard. The storage unit 34 is, for example, a storage means configured with a hard disk drive or a nonvolatile memory, and in the present embodiment, stores an optical character recognition (OCR) engine 35 or the like in advance. The OCR engine 35 is a type of software for performing the character recognition processing. Not only the program 32 but also the OCR engine 35 may be collectively referred to as the image processing program.

In the example in FIG. 1, the main server 30 is communicably connected to the storage server 40. The storage server 40 is also realized by one or a plurality of information processing devices functioning as a server on the network NW. The storage server 40 is a server for acquiring and storing the data from the main server 30. The main server 30 and the storage server 40 may be clearly separated from each other as a device or may not be divided. For example, a configuration may be adopted, in which a common server functions as the main server 30 and the storage server 40. Although not illustrated in FIG. 1, a display unit and an operation receiving unit necessary for the operator to operate these servers may be connected to the main servers 30 and 40.

In order to easily distinguish the control unit 31, the program 32, the communication IF 33, and the like which are the configuration elements of the main server 30 side, and the control unit 21, the program 22, communication IF 23 and the like which are the configuration elements of the communication device 20 side, for convenience, those may be respectively expressed as a first control unit 31, a first program 32, a first communication IF 33, a second control unit 21, a second program 22, a second communication IF 23, and the like.

2. Character Recognition Processing

Figure 2:
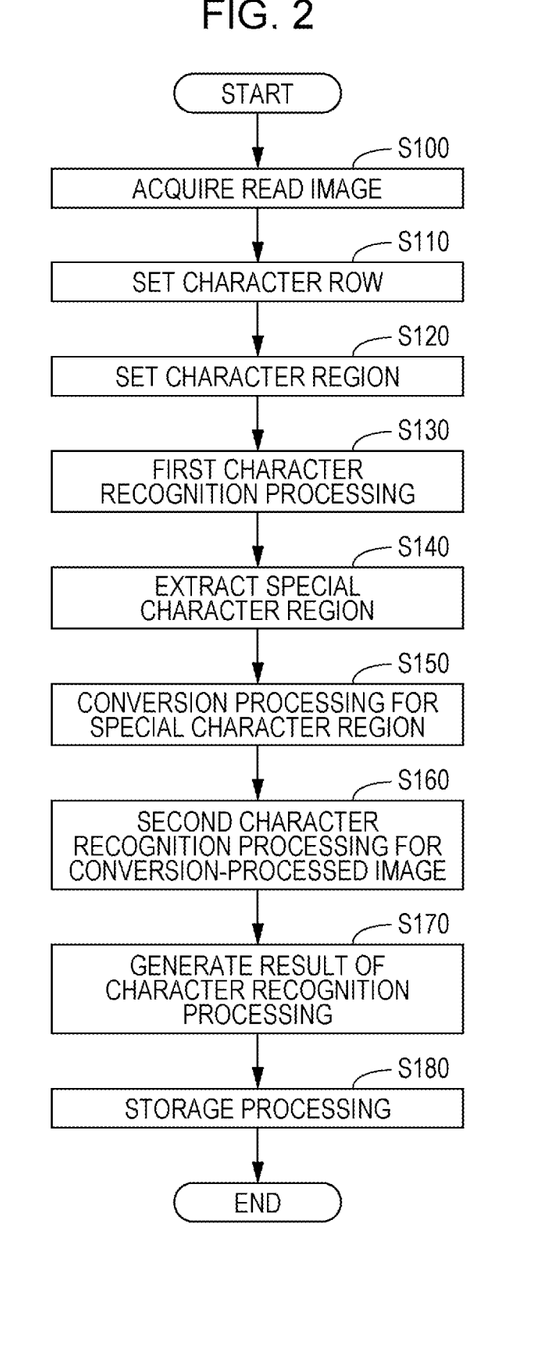
FIG. 2 is a flowchart illustrating processing performed by an image processing device.

FIG. 2 illustrates the image processing performed by the control unit 31 of the main server 30 in accordance with the program 32 using a flowchart. It can be said that at least a part of the flowchart illustrates an image processing method.

In the system 1, first, the scanner 10 generates image data by reading an original document appropriately set by the user. In the present embodiment, it is assumed that the document the user causes the scanner 10 to read is a receipt or a bill issued at a shop or the like. Hereinafter, the receipt or the bill that the user causes the scanner 10 to read is also simply referred to as a document. The scanner 10 transmits the image data (hereinafter referred to as a read image) generated by reading the document to the communication device 20. The control unit 21 of the communication device 20 may instruct the scanner 10 to start reading the document via the communication IF 23, and then, the scanner 10 may start reading the document according to the instruction to start reading the document from the control unit 21.

In the communication device 20, the control unit 21 executing the program 22 uploads the read image received from the scanner 10 to the main server 30 via the communication IF 23 and the network NW.

In the main server 30, the control unit 31 acquires the read image transmitted from the communication device 20 via the communication IF 33 (Step S100). The control unit 31 may temporarily store the read image received from the communication device 20 in the storage unit 34, and may acquire the read image from the storage unit 34 in Step S100. Step S100 corresponds to an acquisition process for acquiring a read image generated by reading the receipt or the bill. In addition, in realizing Step S100, it can be said that the control unit 31 executing the program 32 functions as the acquisition unit 36 that acquires the read image.

In Step S110, the control unit 31 sets a character row in the read image. The character row is a region where the characters are arranged in the horizontal direction in the read image. The length of the character row in the horizontal direction (horizontal width) is a horizontal width of the read image, and the length of the character row in the vertical direction (vertical width) depends on a vertical width of the character included in the character row.

There are various methods of setting the character row, and for example, the control unit 31 binarizes the read image using a threshold value, and then, converts each pixel constituting the read image into either one of the black pixel and the white pixel. The threshold value used here is a predetermined threshold suitable for dividing the pixels into the pixels corresponding to the characters in the read image and the pixels not corresponding to the characters (for example, the pixels corresponding to paper white). Alternatively, the control unit 31 may generate a distribution (histogram) of colors and brightness of pixels constituting the read image, and then, and may determine the threshold value suitable for dividing the pixels into the pixels corresponding to the characters and the pixels not corresponding to the characters by analyzing the histogram. However, the binarization described above is not essential processing, and the control unit 31 only needs to be able to discriminate whether each pixel constituting the read image is a pixel corresponding to a character or a pixel not corresponding to a character.

The control unit 31 classifies each pixel row constituting the read image into a pixel row (first pixel row) that includes at least one pixel corresponding to the characters, that is, black pixels, and a pixel row (second pixel row) that is constituted only by the pixels not corresponding to the characters, that is, white pixels. The pixel row is a region where the pixels are continuous in the horizontal direction of read image, the horizontal width of the pixel row is the horizontal width of the read image, and the vertical width of the pixel row is the vertical width of one pixel. The control unit 31 sets a region where the first pixel row is continuous in the vertical direction of the read image as one character row. Equal to or more than one second pixel rows exist between the region where the first pixel rows are continuous in the vertical direction and another region where the first pixel rows are continuous in the vertical direction. The control unit 31 may set a region where a few second pixel rows are added to an upper end and a lower end of the region where the first pixel row continues in the vertical direction as one character row. The character row and the character row may be in contact with each other in the vertical direction within the read image, a space region constituted by only the second pixel row may be interposed between the character row and the character row.

Figure 3:
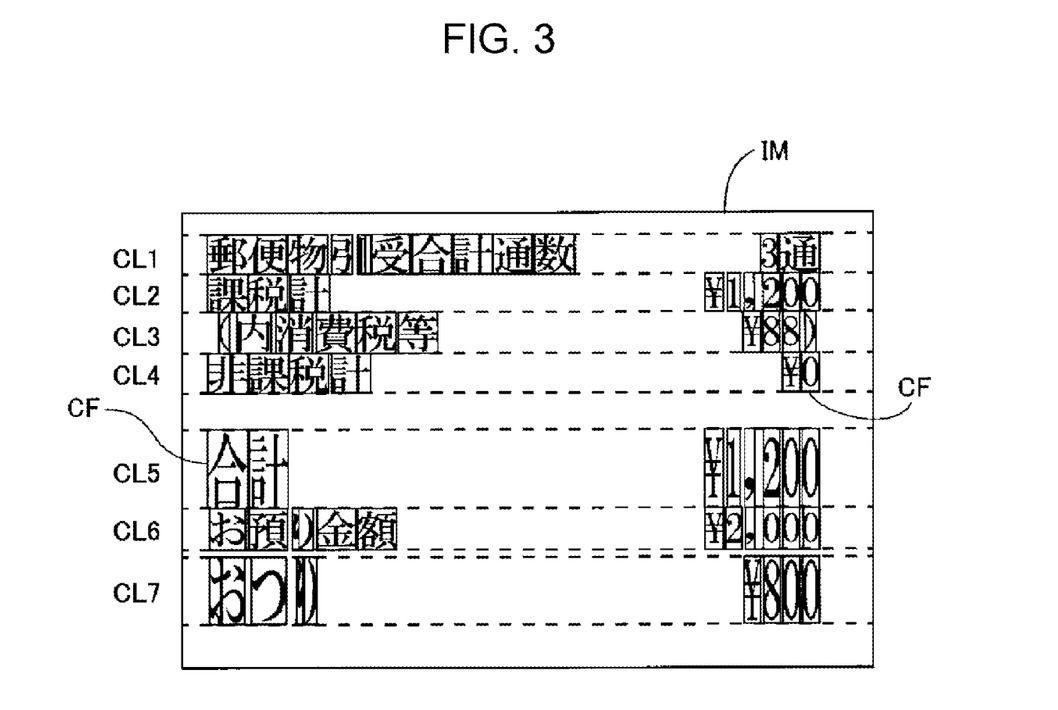
FIG. 3 is a diagram for explaining a specific example of the processing in Steps S110 and S120.

FIG. 3 is a diagram for explaining the processing in Step S110 and S120 with specific examples. FIG. 3 illustrates a part of a read image IM acquired by the control unit 31 in Step S100. The read image IM is image data generated by the scanner 10 reading a receipt issued by a shop where the user visited. A plurality of dashed lines toward the horizontal direction of the read image IM illustrated in FIG. 3 indicate the upper end or the lower end of each character row set in Step S110. That is, FIG. 3 illustrates each of character rows CL1, CL2, CL3, CL4, CL5, CL6, and CL7 segmented by such upper end and lower end lines is illustrated.

In Step S120, the control unit 31 sets a character region in the character row set in Step S110, which is a region in a unit of character. The control unit 31 sets a rectangular region including one character in the character row as one character region. The "character region which is a region in a unit of character" is just an image region grasped as one character by the processor (CPU 31*a*) executing the program 32 in Step S120. Therefore, for example, each element constituting one character (for example, each radical of Chinese letters) may be set to a different character region.

There are various methods for setting the character region, and for example, the control unit 31 classifies the each pixel column constituting the character row into a pixel column (first pixel column) that includes one or more pixels corresponding to the characters, that is, the black pixels, and a pixel column (second pixel column) that is constituted only by the pixels not corresponding to the characters, that is, the white pixels. The pixel column constituting the character row is a region where the pixels are continuous in the vertical direction within a character row. The horizontal width of the pixel column constituting the character row is the horizontal width of one pixel, and the vertical width of the pixel column constituting the character row is the vertical width of the character row. The control unit 31 sets the region where the first pixel column is continuous in the horizontal direction of the read image in the character row as one character region. Equal to or more than one second pixel columns exist between the region where the first pixel column is continuous in the horizontal direction and another region where the first pixel column is continuous in the horizontal direction within the character row. The control unit 31 may set the region where a few second pixel column are added to a left end and a right end of the region where the first pixel column is continuous in the horizontal direction as one character region. In character row, the character region and the character region may be in contact with each other in the horizontal direction, and a space region constituted only by the second pixel column may be interposed between the character region and the character region.

In FIG. 3, each rectangle in each character row CL1 to CL7 indicates one character region CF set in Step S120. In a point of realizing these Steps S110 and S120, it can be said that the control unit 31 executing the program 32 functions as the setting unit 38 that sets the character region which is the region in a unit of character included in the read image.

In Step S130, the control unit 31 activates an OCR engine 35 and causes the OCR engine 35 to perform character recognition processing on the character region set in Step S120. The OCR engine 35 sequentially inputs the character regions as images and outputs the characters recognized (guessed) from the image as the character data (text data). The control unit 31 temporarily stores the text data as a result of character recognition processing in Step S130, for example, in the storage unit 34. The character recognition processing in Step S130 is also referred to as first character recognition processing.

Figure 4A:
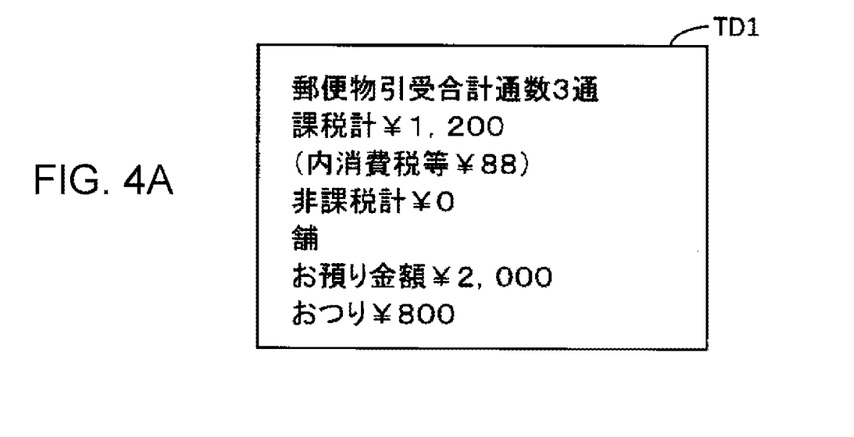
FIG. 4A is a diagram illustrating text data as a result of first character recognition processing in Step S130.

FIG. 4A illustrates text data TD1 as a result of first character recognition processing. As can be seen by comparing the text data TD1 with the read image IM in FIG. 3, in the result of first character recognition processing, the character included in the read image IM is not always accurately recognized. For example, the character "合計" (total sum) included in the character line CL5 of the read image IM is erroneously recognized as a character "舗" (store) and becomes a part of the text data TD1. In addition, in the character line CL5 of the read image IM, the character "1,200 Yen" existing on the right side of the character "合計" is unrecognizable in the first character recognition processing, and does not exist in the text data TD1.

The reason why the result of first character recognition processing tends to be less accurate as described above will be described.

In a document such as a receipt read by the scanner 10, some characters are sometimes printed in a size larger than other characters. In the example of the read image IM, the character "合計", the character "1,200 Yen", and the like in the same row as the character "合計" described above are printed in a size of which the vertical width is larger than those of other characters. In many cases in the receipt or the like, some part of information that is regarded as particularly important such as character relating to an amount of money, name of the store, and the like are printed in a large size.

In today's general printing system, an outline font is used for character expression, and the character is printed while the aspect ratio is kept regardless of the font size. On the other hand, in many cases, thermal printers and serial impact dot matrix (SIDM) printers which are often used for receipt printing and the like has font data of a basic size (for example, a size corresponding to 10.5 points) in order to perform printing with holding the minimized information and configuration, and for the characters of other sizes, the fonts of the basic size are transformed to realize the required size. Therefore, in many cases in the receipt or the like, the character printed in a large size font as described above is a character in which the aspect ratio of the basic sized character is changed.

Figure 5A:
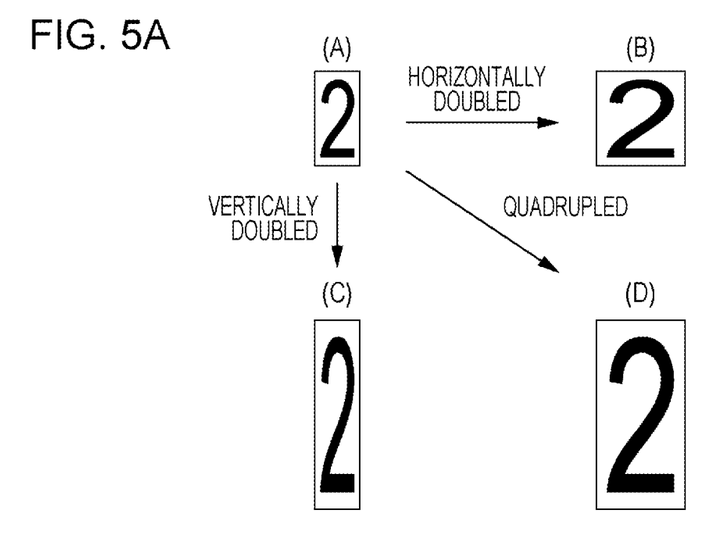
FIG. 5A is a diagram illustrating a state in which a one-byte character of a basic size is transformed to a larger size.
Figure 5B:
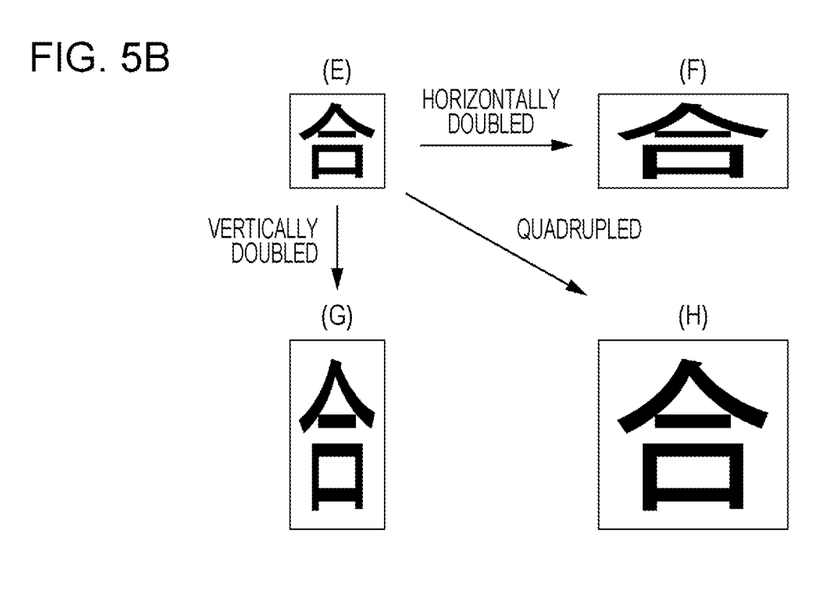
FIG. 5B is a diagram illustrating a state in which the two-byte character of the basic size is transformed to a larger size.

FIG. 5A and FIG. 5B illustrate a state in which the thermal printers and the SIDM printers, which are often used for printing such as a receipt, transform the basic sized characters to generate the characters larger than basic sized character.

FIG. 5A illustrates a state in which a one-byte character of a basic size "2" indicated in (A) of FIG. 5A is transformed to a larger sized character. That is, (B) of FIG. 5A illustrates an image obtained by enlarging the image of one-byte character of the basic size "2" twice in the horizontal direction. Enlarging twice in the horizontal direction is also expressed as horizontal doubling. (C) of FIG. 5A illustrates an image obtained by enlarging the image of one-byte character of the basic size "2" twice in the vertical direction. Enlarging twice in the vertical direction is also expressed as vertical doubling. (D) of FIG. 5A illustrates an image obtained by enlarging the image of one-byte character of the basic size "2" twice in the horizontal direction and the vertical direction. Enlarging twice in both the horizontal direction and the vertical direction is also expressed as quadrupling.

FIG. 5B illustrates a two-byte character of the basic size "合" indicated in (E) of FIG. 5B is transformed to a larger sized character. That is, (F) of FIG. 5B illustrates an image obtained by horizontally doubling the two-byte character of the basic sized "合". (G) of FIG. 5B illustrates an image obtained by vertically doubling the image of two-byte character of the basic size "合". FIG. (H) of 5B illustrates an image obtained by quadrupling the image of two-byte character of the basic size "合". In general, in the OCR engine 35 used for the character recognition processing, the character recognition accuracy for the images of large sized character illustrated in FIG. 5A and FIG. 5B is not always good. Particularly, the character recognition accuracy for an image expressing the character in which the aspect ratio is changed from the aspect ratio of the basic size is likely to be decreased. Therefore, as described using the example of FIG. 4A, the result of first character recognition processing may be less accurate. In view of such a problem, Steps S140 to S160 are performed in the present embodiment.

In Step S140, the control unit 31 extracts a special character region which is a region of a special character among the character region in a unit of character set in Step S120. The special character is a character having a size different from the basic size. In the present embodiment, it is assumed that the special character is included in the read image acquired in Step S100.

In Step S150, the control unit 31 performs conversion processing to make the size closer to the basic size for the special character region.

In Step S160, the control unit 31 causes the OCR engine 35 to perform the character recognition processing on the above-described conversion-processed character region. That is, the OCR engine 35 sequentially inputs the conversion-processed read image according to Step S150 as an image, and outputs the character recognized (guessed) from the image as the character data (text data). The control unit 31 temporarily stores the text data as the result of character recognition processing in Step S160, for example, in the storage unit 34. In order to distinguish the character recognition processing in Step S160 from the character recognition processing in Step S130, it is also referred to as second character recognition processing.

In a point of realizing Step S150, it can be said that the control unit 31 executing the program 32 functions as the conversion unit 37 that performs conversion processing to make the size of the special character included in the read image close to the basic size. In addition, in a point of realizing Step S160, it can be said that the control unit 31 functions as a character recognition unit that performs character recognition processing on the conversion-processed read image. The processor (the CPU 31a) performing the character recognition processing using the OCR engine 35 may be referred to as the character recognition unit. In addition, Step S150 corresponds to the conversion processing of converting the size of the special character included in the read image to the basic size, and Step S160 corresponds to a character recognition process of performing character recognition processing on the conversion-processed read image.

Figure 6:
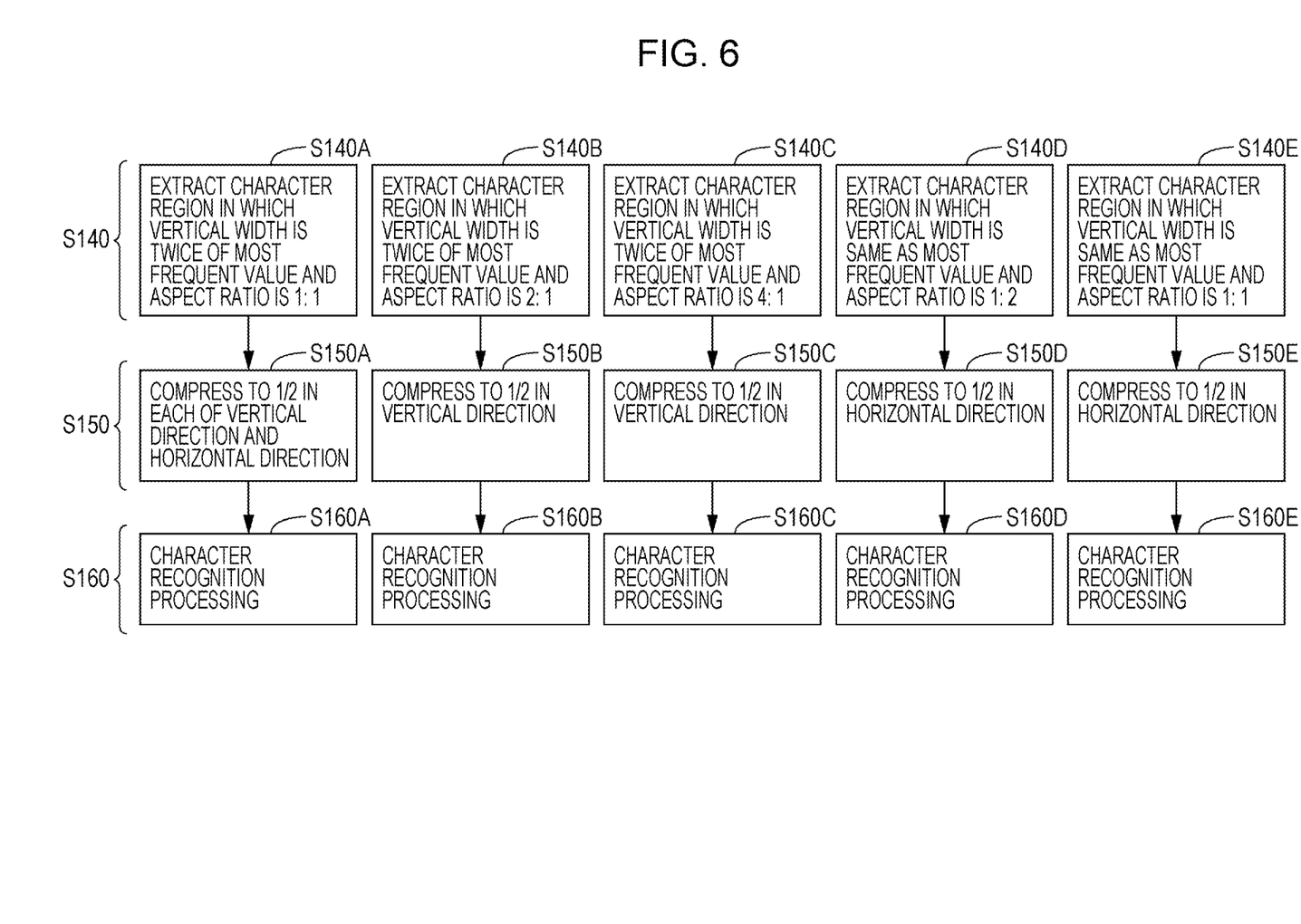
FIG. 6 is a flowchart illustrating a specific example of the processing in Steps S140, S150, and S160.

FIG. 6 illustrates a specific example of the processing items in Steps S140, S150, and S160 using a flowchart. Steps S140A, S150A, and S160A indicate the processing items in Steps S140, S150, and S160 for the character region set in Step S120. Similarly, Steps S140B, S150B, and S160B, Steps S140C, S150C, and S160C, Steps S140D, S150D, and S160D, and Steps S140E, S150E, and S160E respectively indicate the processing items in Step S140, S150, and S160 for the character region set in Step S120. However, there is no case where one character region set in Step S120 is subject to a plurality of processing items among the processing items in Steps S140A, S150A, and S160A, the processing items in Steps S140B, S150B, and S160B, the processing items in Steps S140C, S150C, and S160C, the processing items in Steps S140D, S150D, and S160D, and the processing items in Steps S140E, S150E, and S160E.

In Step S140A, the control unit 31 extracts a character region having a vertical width twice the most frequent value of the vertical width of the character region among the character region set in Step S120 and having an aspect ratio of 1:1. The vertical width of the character region is the vertical width of the character row in which the character region is included.

Referring to the example in FIG. 3, the control unit 31 acquires a most frequent value among the vertical width of each of the character rows CL1 to CL7. In many cases in the read image IM generated by reading the receipt, the vertical width of many of the character rows CL1 to CL7 is same as the vertical width of the basic size as described above, and the vertical width of some character rows is relatively large. However, when comparing the vertical widths of the character rows included in the read image, even if the vertical widths of the character rows are almost the same, there is a case where the vertical widths are not perfectly coincident with each other. In view of such circumstances, when comparing the vertical widths of the character rows included in the read image, the control unit 31 may regard the vertical widths as the same vertical widths even if there is a difference within a predetermined degree. As an example, when comparing the vertical widths of the character rows, if one vertical width is taken as 100% and the other vertical width falls within the range of 95% to 105%, the vertical widths of both character rows being compared are regarded as equal. Then, for example, the control unit 31 sets the average value of the vertical widths of a plurality of character rows regarded to be equal, as the most frequent value of the vertical widths of the character region.

Referring to FIG. 5A and FIG. 5B, the character region having the vertical width of twice the most frequent value of the vertical width of the character region and having the aspect ratio of 1:1 corresponds to the image in which two-byte character is quadrupled as illustrated in (H) of FIG. 5B. That is, in Step S140A, the character region including the character in which the two-byte character of the basic size among the character regions set in Step S120 is quadrupled is extracted as the special character region.

However, when extracting the special character region in Step S140, the control unit 31 may regard the "vertical width of N times the most frequent value of the vertical width of the character region (for example, N=2)" as N times of vertical width even if there are differences within a predetermined degree as well as the exact N times. Similarly, regarding the aspect ratio of the special character region to be extracted in Step S140, not only pursuing the strict aspect ratio (for example 1:1) but the difference within a predetermined degree may be allowed.

In Step S150A, the control unit 31 compresses each of the character regions (the special character regions) extracted in Step S140A to ½ in each of the vertical direction and the horizontal direction. That is, the conversion processing to return the character in which the two-byte character of the basic size is quadrupled back to the two-byte character of the basic size is performed. In Step S160A, the control unit 31 performs the character recognition processing using the OCR engine 35 for the character region which is the result of conversion in Step S150A. The special character region extracted in Step S140 is a part of the read image. Therefore, performing the character recognition processing in Step S160 on the character region which is a result of conversion of the special character region in Step S150 is included in the concept of performing the character recognition processing on the conversion-processed read image.

In Step S140B, the control unit 31 extracts a character region having a vertical width twice the most frequent value of the vertical width of the character region among the character region set in Step S120 and having an aspect ratio of 2:1. Referring to FIG. 5A and FIG. 5B, the character region having a vertical width twice the most frequent value of the vertical width of the character region and having an aspect ratio of 2:1 corresponds to the image in which one-byte character is quadrupled as illustrated in (D) of FIG. 5A or the image in which two-byte character is vertically doubled as illustrated in (G) of FIG. 5B. That is, in Step S140B, the character region including the character in which the one-byte character of the basic size among the character regions set in Step S120 is quadrupled and the character region including the character in which the two-byte character of the basic size is vertically doubled are extracted as the special character region.

In Step S150B, the control unit 31 compresses each of the character regions (the special character regions) extracted in Step S140B to ½ in the vertical direction. In this way, the character in which the two-byte character of the basic size is vertically doubled is returned back to the two-byte character of the basic size. In addition, the character in which the one-byte character of the basic size is quadrupled is converted into the two-byte character of the basic size. In Step S160B, the control unit 31 performs the character recognition processing using the OCR engine 35 for the character region which is the result of conversion in Step S150B.

The "合計" included in the character row CL5 of the read image IM illustrated in FIG. 3 is a character in which two-byte character of the basic size is vertical doubled. Therefore, each character region CF including "合" and "計" which is each character "合計" is extracted as the special character region in Step S140B, and is subject to the processing in Step S150B and Step S160B.

In Step S140C, the control unit 31 extracts a character region having a vertical width twice the most frequent value of the vertical width of the character region among the character region set in Step S120 and having an aspect ratio of 4:1. Referring to FIG. 5A and FIG. 5B, the character region having the vertical width of twice the most frequent value of the vertical width of the character region and having the aspect ratio of 4:1 corresponds to the image in which one-byte character is vertically doubled as illustrated in (C) of FIG. 5A. That is, in Step S140C, the character region including the character in which the one-byte character of the basic size among the character regions set in Step S120 is vertically doubled is extracted as the special character region.

In Step S150C, the control unit 31 compresses each of the character regions (the special character regions) extracted in Step S140C to ½ in the vertical direction. In this way, the character in which the one-byte character of the basic size is vertically doubled is returned to one-byte character of the basic size. In Step S160C, the control unit 31 performs the character recognition processing using the OCR engine 35 for the character region which is the result of conversion in Step S150C.

"1,200 Yen" included in the character row CL5 of the read image IM illustrated in FIG. 3 is a character in which the one-byte character of the basic size is vertically doubled. Therefore, each character region CF including each character constituting the "1,200 Yen" is extracted as a special character region in Step S140C, and is subject to the processing items in Step S150C and Step S160C.

Figure 7:
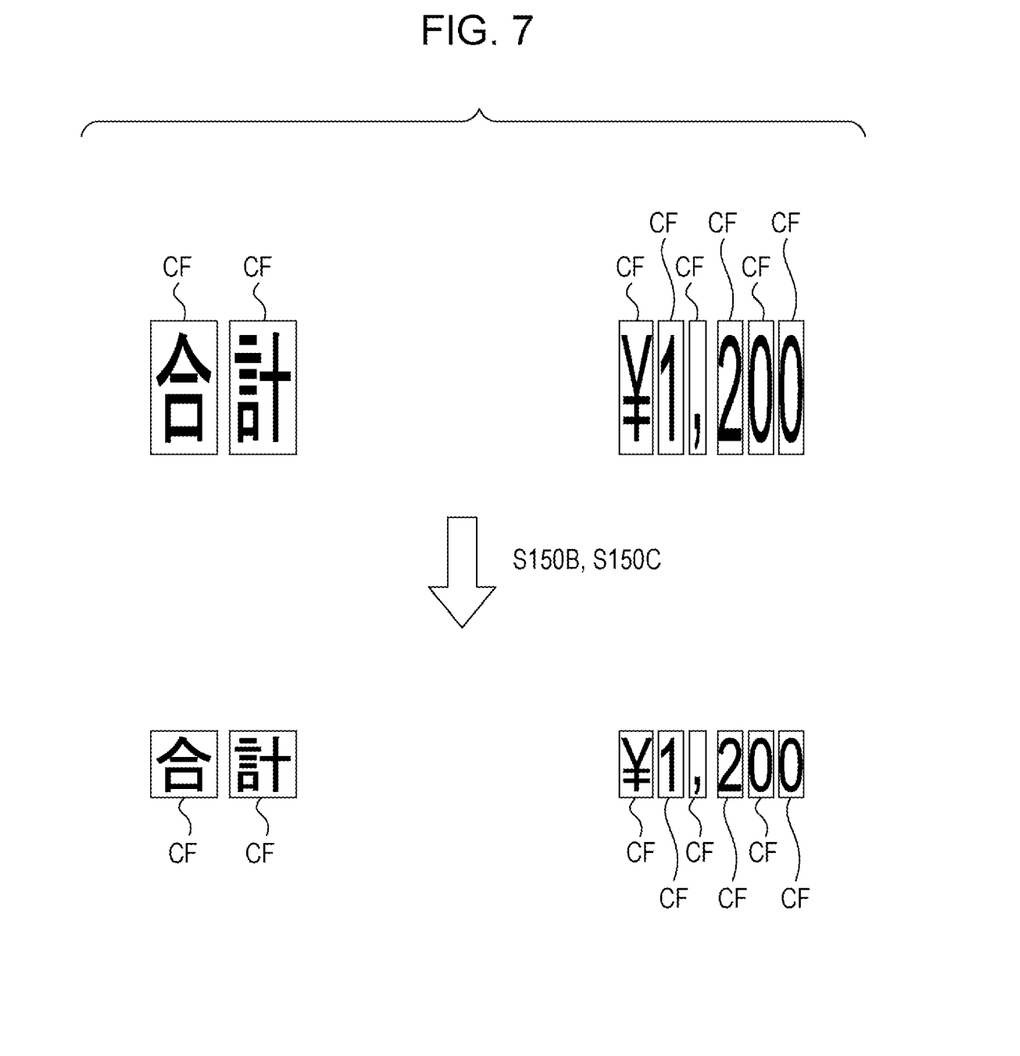
FIG. 7 is a diagram illustrating a specific example of conversion in Steps S150B and S150C for a part of a character region a read image.

FIG. 7 illustrates a state in which each character region CF for each character constituting "合計" and "1,200 Yen" included in the character row CL5 of the read image IM is subjected to the conversion processing by any of Step S150B or Step S150C, and is compressed to ½ in the vertical direction.

In Step S140D, the control unit 31 extracts a character region having a vertical width same as the most frequent value of the vertical width of the character region among the character region set in Step S120 and having an aspect ratio of 1:2. Referring to FIG. 5A and FIG. 5B, the character region having a vertical width same as the most frequent value of the vertical width of the character region and having an aspect ratio of 1:2 corresponds to the image in which two-byte character is horizontally doubled as illustrated in (F) of FIG. 5B. That is, in Step S140D, the character region including the character in which the two-byte character of the basic size among the character regions set in Step S120 is horizontally doubled is extracted as the special character region.

In Step S150D, the control unit 31 compresses each of the character regions (the special character regions) extracted in Step S140D to ½ in the horizontal direction. In this way, the character in which the two-byte character of the basic size is horizontally doubled is returned back to the two-byte character of the basic size. In Step S160D, the control unit 31 performs the character recognition processing using the OCR engine 35 for the character region which is the result of conversion in Step S150D.

In Step S140E, the control unit 31 extracts a character region having a vertical width same as the most frequent value of the vertical width of the character region among the character region set in Step S120 and having an aspect ratio of 1:1. Referring to FIG. 5A and FIG. 5B, the character region having the vertical width same as the most frequent value of the vertical width of the character region and having the aspect ratio of 1:1 corresponds to the image in which one-byte character is horizontally doubled as illustrated in (B) of FIG. 5A, or two-byte character as illustrated in (E) of FIG. 5B. That is, in Step S140E, the character region including the character in which the one-byte character of the basic size among the character regions set in Step S120 is vertically doubled and the character region including the two-byte character of the basic size which is larger than the one-byte character of the basic size are extracted as the special character region.

In Step S150E, the control unit 31 compresses each of the character regions (the special character regions) extracted in Step S140E to ½ in the horizontal direction. In this way, the character in which the one-byte character of the basic size is horizontally doubled is returned to the one-byte character of the basic size. In addition, the two-byte character of the basic size is converted into the one-byte character of the basic size. In Step S160E, the control unit 31 performs the character recognition processing using the OCR engine 35 for the character region which is the result of conversion in Step S150E.

In Steps S140, S150, and S160, the control unit 31 may concurrently perform the processing items in Steps S140A, S150A, and S160A, the processing items in Steps S140B, S150B, and S160B, the processing items in Steps S140C, S150C, and S160C, the processing items in Steps S140D, S150D, and S160D, and the processing items in Steps S140E, S150E, and S160E illustrated in FIG. 6. Alternatively, in Steps S140, S150, and S160, the control unit 31 may perform the processing items in Steps S140A, S150A, and S160A, the processing items in Steps S140B, S150B, and S160B, the processing items in Steps S140C, S150C, and S160C, the processing items in Steps S140D, S150D, and S160D, and the processing items in Steps S140E, S150E, and S160E illustrated in FIG. 6 in this order.

According to the description above, in the Step S150 (Steps S150A, S150B, S150C, S150D, and S150E), it can be said that the basic size when converting the size of the character included in the read image into the basic size of character corresponds to the predetermined basic size of the two-byte character and the predetermined basic size of the one-byte character adopted by the thermal printer, the SIDM printer, or the like. In addition, the size of the character before the enlargement processing such as vertical doubling, horizontal doubling, quadrupling and the like as described above in printing the receipt and the like can be referred to as the basic size. Alternatively as another expression, it can be said that the size of character region (basic size of the two-byte character) in which the vertical width is the most frequent value of vertical width of the character region and the aspect ratio is 1:1, and the size of the character region (basic size of the one-byte character) in which the vertical width is the most frequent value of the vertical width of the character region and the aspect ratio is 2:1, are the basic size. In the present embodiment, the most frequent value of the vertical width of the character region may be referred to as the reference width of the basic size.

As described above, by performing the conversion processing items in Step S150 (Steps S150A, S150B, S150C, S150D, and S150E) on the special character region, the character included in the special character region, that is, the special character can become a size suitable for the character recognition processing (the size that the OCR engine 35 easily recognize the characters correctly). As a result, the second character recognition processing items in Step S160 (Steps S160A, S160B, S160C, S160D, and S160E) improves the character recognition accuracy compared to the first character recognition processing. That is, the character "合計" included in the character row CL5 of the read image IM illustrated in FIG. 3 is accurately character recognized by the second character recognition processing in Step S160B, and the character "1,200 Yen" included in the character row CL5 is accurately character recognized by the second character recognition processing in Step S160C.

In Step S170, control unit 31 generates a result of character recognition processing for the read image based on the result of first character recognition processing in Step S130 and the result of second character recognition processing in Step S160. In this case, the control unit 31 compares the text data which is the result of first character recognition processing and the text data which is the result of second character recognition processing, between the characters in which the positions of the character regions in the read image are corresponding to each other. Among the text data which is the result of first character recognition processing, a part different from the text data which is the result of compared second character recognition processing is replaced with the text data which is the result of compared second character recognition processing. The replacement described here includes not only the processing for replacing the character existing in the text data which is the result of first character recognition processing with the character existing in the text data which is the result of second character recognition processing but also the processing for replenishing the characters not existing in the text data which is the result of first character recognition processing with the character existing in the text data which is the result of second character recognition processing.

Figure 4B:
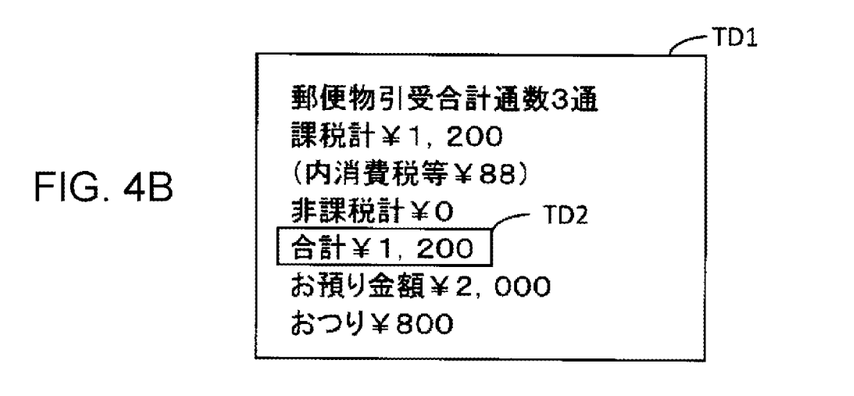
FIG. 4B is a diagram illustrating text data generated in Step S170 as a result of character recognition processing.

FIG. 4B illustrates an example of the result of character recognition processing on the read image generated in Step S170 based on the text data TD1 as a result of first character recognition processing and the text data TD2 as a result of second character recognition processing. As can be seen by comparing FIG. 4B with FIG. 4A, a part of the text data TD1 has been replaced by the text data TD2. That is, the character of "舗" which is the result of recognition by the first character recognition processing on the character of "合計" included in the character row CL5 of the read image IM is replaced with the character of "合計" which is the result of recognition by the second character recognition processing. In addition, the character "1,200 Yen" included in the character row CL5 of the read image IM is missing in the result of recognition by the first character recognition processing, however, such a missing is replenished by the character "1,200 Yen" which is the result of recognition by the second character recognition processing.

Here, the character region extracted in Step S140E (FIG. 6) from the character regions set in Step S120 corresponds to the two-byte character of the basic size. That is, the character region extracted in Step S140E is one of the appropriate sizes as a target for the character recognition processing, and thus, there is a high possibility that the correct result of character recognition has already been obtained by the first character recognition processing in Step S130. Therefore, in the present embodiment, the control unit 31 may be configured so as not to perform the processing items in Step S140E, S150E, and S160E in Step S140, S150, and S160 among the processing items illustrated in FIG. 6.

However, in Steps S140, S150, and S160, it cannot be useless to perform the processing items in Steps S140E, S150E, and S160E. For example, the character string "合計" according to the two-byte character of the basic size is printed on the receipt while being horizontally doubled, and the read image generated by the scanner 10 by reading this receipt was acquired in Step S100. Since "合計" is printed in a horizontally doubled state, each of the two radicals "言 (word)" and "十 (ten)" that constitute "計" correspond to the two-byte character of the basic size. In this case, in Step S120, the control unit 31 may set different character regions for each of the "言" and "十" constituting "計". In this situation, there is a high possibility that each of the "言" and "十" which should originally constitute one character "計" is likely to be recognized as one character in the first character recognition processing in Step S130. Therefore, if the processing items in Step S140E, S150E, and S160E are not performed in Step S140, S150, and S160 respectively, the result of first character recognition processing in Step S130 (result of recognizing "計" as "言" and "十") is adopted as the result of character recognition processing in Step S170.

On the other hand, if the processing items in Steps S140E, S150E, and S160E in Steps S140, S150, and S160 respectively, each of the characters "言" and "十" respectively corresponding to the two-byte character of the basic size in the read image are extracted in Step S140E. Then, "言" and "十" extracted in Step S140E are compressed to ½ in the horizontal direction in Step S150E respectively, and are converted into one-byte character size. Therefore, in the character recognition processing (the second character recognition processing) in Step S160E, the possibility that a combination of "言" and "十" after the conversion is recognized as one character "計" is increased, and thus, in step S170, it is possible to easily obtain the more accurate result of character recognition processing. In addition, based on the idea of compressing the two-byte character of the basic size to ½ in the horizontal direction and converting the result into the size of one-byte character, in Step S150B in FIG. 6, the control unit 31 may compress the character region (special character region) extracted in Step S140B to ½ in each of the vertical direction and the horizontal direction. In this case, in Step S150B, the character (refer to (G) of FIG. 5B) in which the two-byte character of the basic size is vertically doubled is converted into one-byte character of the basic size. In addition, in Step S150B, the character (refer to (D) of FIG. 5A) in which one-byte character of the basic size is quadrupled is converted into one-byte character of the basic size.

In Step S180, the control unit 31 stores the text data generated in Step S170 as the result of character recognition processing in the storage server 40. In this case, the control unit 31 stores the result of character recognition processing generated in Step S170, together with the read image acquired in Step S100, in the storage server 40. In this process, the flowchart in FIG. 2 ends.

The control unit 31 may add the predetermined information saying that the character region which is unrecognizable by either of the first character recognition processing in Step S130 or the second character recognition processing in Step S160 among character regions set in Step S120 is the character unrecognizable, to the result of character recognition processing (text data) generated in Step S170. For example, the control unit 31 inserts a specific symbol into a position corresponding to the character region which is the unrecognizable character in the text data generated at Step S170 as a result of character recognition processing.

It is possible to confirm what kind of character is the character that is unrecognizable by the character recognition processing by a human visual observation. That is, an operator operating the storage server 40 displays the read image stored in the storage server 40 and the text data generated in Step S170 which is the result of character recognition processing and stored together with the read image, on a predetermined display unit. Then, for the character corresponding to the position to which the specific symbol is inserted among the displayed text data, the operator may perform a character editing work to confirm what character it is while viewing the read image.

Of course, the character editing work performed by the operator may be received by the main server 30. In other words, the control unit 31 may receive the character editing work by the operator while displaying the read image and the text data generated in Step S170 in correspondence with the read image and which is the result of character recognition processing, on the predetermined display on a predetermined display unit according to the operation of the operator. Then, the control unit 31 may store the text data obtained by the character editing work in the storage server 40 together with the read image (Step S180).

The text data as a result of character recognition processing and stored with the read image in the storage server 40 is provided to the outside via the network NW. The text data stored in the storage server 40 is the text data expressing the character strings described in the documents such as the receipt and bill. Therefore, the text data stored in the storage server 40 is transmitted to a terminal operated by the accounting office which processes accounting processing and tax processing, for example, via the network NW, and is used for the accounting processing and the tax processing. The text data stored in the storage server 40 is printed by a printer connected to the network NW, or transmitted to the communication device 20 via the network NW according to the request of the user of the communication device 20 and the scanner 10.

3. Summary

As described above, according to the present embodiment, the image processing device (the main server 30) includes an acquisition unit 36 that acquires a read image including a special character having a size different from a basic size of the character generated by reading a receipt or a bill, a conversion unit 37 that converts the size of the special character included in the read image close to the basic size, and a character recognition unit that performs character recognition processing on the conversion-processed read image.

According to the above-described configuration, the image processing device can perform the character recognition processing on the image including character which is converted into the basic size or converted into the size close to the basic size. Therefore, it becomes possible to obtain a more appropriate result of character recognition for the characters of some special size among the characters printed on the receipt and the like, compared to the case where it was difficult to obtain a correct result of character recognition in the related art.

the description relating to Step S150 (Steps S150A, S150B, S150C, S150D, and S150E) in FIG. 6, an easy to understand description was made, in which the size of the character (the special character) in the special character region returns to the basic size by compressing the special character region in the vertical direction and/or the horizontal direction. However, the conversion processing in Step S150 is not the processing to guarantee that the size of the special character is converted into the basic size. Converting the size of the special character into the basic size by the conversion processing in Step S150 is one of an ideal matter, but in reality, even if the conversion processing in Step S150 is performed, the size of conversion-processed character may not coincide with the basic size. However, it can be said that at least the special character size may be close to the basic size by conversion processing in Step S150.

In addition, according to the present embodiment, the image processing device includes a setting unit 38 that sets a character region which is a region in a unit of character included in the read image, and the conversion unit 37 performs the conversion processing on a special character region which is a region of the special character in the character region.

According to the configuration described above, the image processing device performs conversion processing on the special character region among the character region. Therefore, it becomes possible to obtain a more appropriate result of character recognition for the characters having a different size from the basic size of the characters printed on the receipt and the like, compared to the case where it was difficult to obtain a correct result of character recognition in the related art.

Particularly in the present embodiment, the special character region is extracted from the read image of the receipt or the like including the character printed by vertically doubling or horizontally doubling the two-byte character or the one-byte character of the basic size, and the conversion is performed on the special character region. In this way, it becomes possible to accurately recognize the characters printed by vertically doubling and the characters printed by horizontally doubling, which was difficult to accurately recognize the characters in the related art.

In the description above, the description is made under the consumption that the special character having the size different from the basic size is mainly the character having the size larger than the basic size. However, an aspect in which a character having a size smaller than the basic size can be a target for conversion as a special character is included in the present embodiment. That is, the conversion unit 37 may perform the conversion processing for making the size of the special character smaller than the basic size included in the read image be close to the basic size (Step S150), and the character recognition unit may perform the character recognition processing on the conversion-processed read image with a (Step S160).

In addition, according to the present embodiment, the conversion unit 37 converts the character region with setting the most frequent value of the vertical width of the character region as the vertical width (reference width) of the basic size, and the character region of which vertical width is different from the reference width is set as one of the special character region.

According to the configuration described above, the image processing device can accurately extract the special character region corresponding to the character printed by vertical doubling of the basic size based on the most frequent value of the vertical width of the character region, and then, can perform the conversion processing on the special character region.

The reference width used to extract the special character region may be the most frequent value of the horizontal width of the character region. That is, the conversion unit 37 may convert the character region with setting the most frequent value of the horizontal width of the character region set in Step S120 as the horizontal width (reference width) of the basic size, and with extracting the character region of which horizontal width is different from the horizontal width (reference width) of the basic size as one of the special character regions (Step S140), and then, may perform the conversion processing on the special character region. According to such a configuration, the image processing device can accurately extract the special character region corresponding to the character printed by horizontal doubling of the basic size based on the most frequent value of the horizontal width of the character region, and then, can perform the conversion processing on the special character region.

Therefore, it can be said that the conversion unit 37 can perform the conversion processing with setting the most frequent value of any one width in the vertical direction or in the horizontal direction of the character region as the reference width of the basic size, and with setting the character region of which any one width is different from the reference width as one of the special character region.

In addition, according to the present embodiment, when the most frequent value of the vertical width of the character region is set as the reference width of the basic size, the conversion unit 37 performs the conversion processing on the special character region (for example, Steps S140D and S150D) with setting the character region having a horizontal width greater than the reference width as one of the special character regions.

According to the configuration described above, the image processing device can accurately extract the special character region corresponding to the character printed by horizontal doubling of the basic size of two-byte character, based on the most frequent value of the vertical width of the character region, and then, can perform the conversion processing on the special character region.

In addition, according to the present embodiment, the character recognition unit performs the character recognition processing on the read image before the conversion processing (Step S130), and among the results of the character recognition processing on the read image before the conversion processing, replaces a portion different from the result of character recognition processing on the conversion-processed read image with the result of character recognition processing on the conversion-processed read image (Step S170).

According to the configuration described above, with the result of character recognition processing on the read image before the conversion processing as a base, and among the base, the image processing device replaces the portion different from the result of character recognition processing on the conversion-processed read image among the base with the result of character recognition processing on the conversion-processed read image. In this way, it is possible to generate an appropriate result of character recognition for the entire read image.

In the description of Step S150 (Steps S150A, S150B, S150C, S150D, and S150E) in FIG. 6, the conversion ratio of the size applied for the conversion processing on the special character region is a compression rate of ½ in the vertical direction or the horizontal direction. However, such a specific value of ½ is merely an example in the embodiment. The control unit 31 recognizes the basic size and a special character region to which the conversion in Step S150 is to be applied (a special character region which is a region of a size different from the basic size). Therefore, in Step S150, the control unit 31 can determine the conversion ratio necessary for converting the size of the special character to the basic size according to the ratio of the vertical width and the ratio between the horizontal width of the basic size and the special character region to which the conversion in Step S150 is to be applied.

In addition, in the description based on FIG. 6, the special character region extracted from the read image in Step S140 (Steps S140A, S140B, S140C, S140D, and S140E) is a character region of a character printed by enlarging the basic size twice in the vertical direction or in the horizontal direction. However, it is natural that the size of the special character region assumed in the present embodiment can be considered other number. That is, in the special character region extracted in Step S140 may be a character region of a character printed by enlarging or reducing the basic size by a multiple (for example, 0.5 times, 1.5 times, tripling, quadrupling, . . . ) that is different from twice in the vertical direction or in the horizontal direction.

4. Other Embodiment

Embodiments of the invention are not limited to the above-described embodiment, and include, for example, various aspects described below. The embodiment explained so far is also referred to as the first embodiment for convenience.

Figure 8:
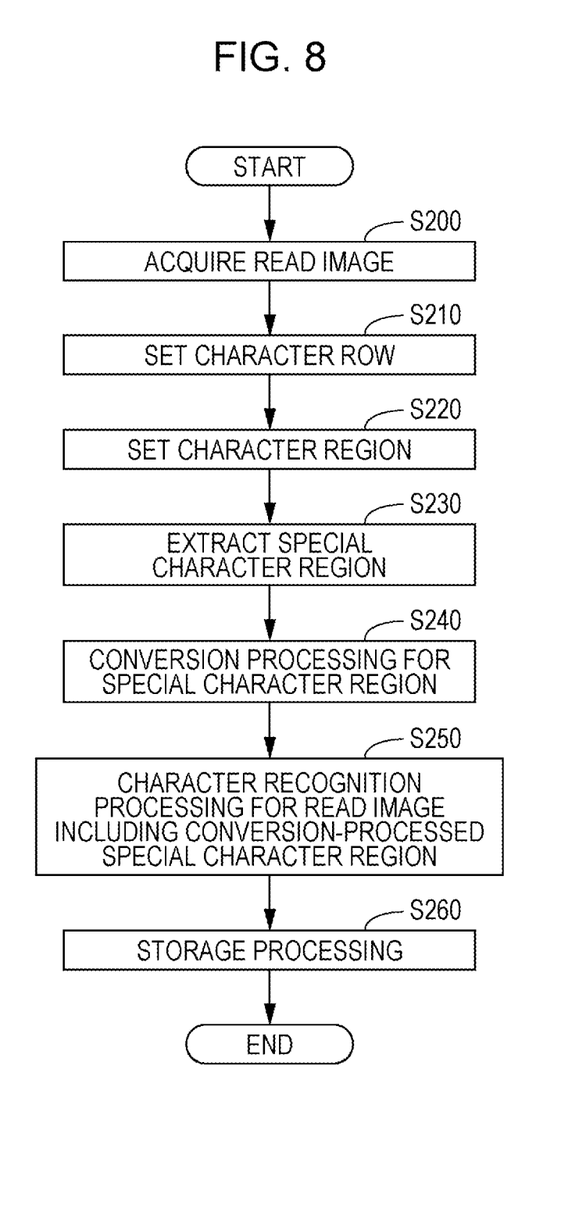
FIG. 8 is a flowchart illustrating processing performed by an image processing device in a second embodiment.

FIG. 8 is a flowchart illustrating the processing according to a second embodiment, which is image processing performed by the control unit 31 of the main server 30 in accordance with the program 32. The second embodiment will be described mainly for the points different from that of the first embodiment.

Processing items in Steps S200 to S220 in FIG. 8 are the same processing items as in Steps S100 to S120 in FIG. 2. In addition, the processing items Steps S230 and S240 subsequent to Step S220 are the same processing as in Steps S140 and S150. In the second embodiment, the first character recognition processing in Step S130 described in the first embodiment, that is, the character recognition processing on the special character region for the read image before the conversion processing is omitted.

In Step S250, the control unit 31 activates the OCR engine 35 and causes the OCR engine 35 to perform the character recognition processing for the read image including the conversion-processed character region in Step S240. That is, in Step S250, the character recognition processing is performed on all of the conversion-processed character region in Step S240 and the character region which is not subject to the conversion processing in Step S240 among character regions set in Step S220. Then, in Step S260, the control unit 31 stores the text data as the result of character recognition processing in Step S250, into a predetermined storage destination, for example, the storage server 40 together with the read image acquired in Step S200.

According to the second embodiment described above, one of the image processing methods is realized, which includes an acquisition process (Step S200) of acquiring the read image including the special character having the size different from the basic size of the character generated by reading the receipt or the bill, a conversion process (Step S240) of converting the size of the special character included in the read image to the basic size, and a character recognition process (Step S250) of performing the character recognition processing on the conversion-processed read image. According to the second embodiment, since the image processing device (the main server 30) performs the character recognition processing on the image including the character which is converted to a basic size converted to a size close to the basic size, it becomes possible to obtain a more appropriate result of character recognition compared to a case in the related art where was difficult to obtain a correct result of character recognition for some characters having special size among characters printed on receipt or the like.

Other Descriptions

In the description above, as a specific example of the image processing device according to the invention, the main server 30 included in the system 1 has been described. However, the specific example of the image processing device is not limited to the main server 30. For example, the image processing device in the invention may be realized by the communication device 20 that acquires the read image of the document from the scanner 10 using the device's own resources. That is, in the communication device 20, the OCR engine 35 and the like are stored in a storage means such as the ROM 21b and a memory other than the ROM 21b, and the control unit 21 may perform the processing described as being performed by the control unit 31 according to the program 22. In this case, the communication device 20 may use the storage means such as the memory or the like owned by the communication device 20 itself or an external server (for example, a storage server 40) as the storage destination for the read image and the text data in Step S180 and S260 (storage processing).

The OCR engine 35 may not be the software stored in the storage unit 34 or the memory but may be hardware that functions in cooperation with the software. In that case, the OCR engine 35 itself can be referred to as a character recognition unit that performs the character recognition processing.

The entire disclosure of Japanese Patent Application No. 2018-043850, filed Mar. 12, 2018 is expressly incorporated by reference herein.

What is claimed is:

1. An image processing device comprising:
    an acquisition unit that acquires a read image generated by reading a receipt or a bill and including a special character having a size different from a basic size of a character;
    a setting unit that sets character regions which are regions in a unit of character included in the read image;
    a conversion unit that performs conversion processing on the size of the special character included in the read image into a size close to the basic size; and
    a character recognition unit that performs character recognition processing on the conversion-processed read image, wherein
    the conversion unit performs the conversion processing on a special character region which is a region of the special character in the character regions, and
    in assumption that a most frequent value of any one width of the character regions in a vertical direction or in a horizontal direction is a reference width of the basic size, the conversion unit makes a character region of the character regions of which any one width is different from the reference width as a target of the conversion processing, which is the special character region.

2. The image processing device according to claim 1, wherein when the most frequent value of the character regions in the vertical width is set as the reference width of the basic size, the conversion unit makes a character region of the character regions having the horizontal width greater than the reference width as the target of the conversion processing, which is the special character region.

3. The image processing device according to claim 1, wherein the character recognition unit performs the character recognition processing on the read image before the conversion processing, and among results of the character recognition processing on the read image before the conversion processing, replaces a portion different from the result of character recognition processing on the conversion-processed read image with the result of character recognition processing on the conversion-processed read image.

4. A non-transitory computer readable medium having stored thereon computer-executable instructions that, when executed by a processor, cause the processor to execute operations, the operations comprising:
acquiring a read image generated by reading a receipt or a bill and including a special character having a size different from a basic size of a character;
setting character regions which are regions in a unit of character included in the read image;
performing conversion processing on the size of the special character included in the read image into a size close the basic size; and
performing character recognition processing on the conversion-processed read image, wherein
performing the conversion processing on a special character region which is a region of the special character in the character regions, and
in assumption that a most frequent value of any one width of the character regions in a vertical direction or in a horizontal direction is a reference width of the basic size, making a character region of the character regions of which any one width is different from the reference width as a target of the conversion processing, which is the special character region.

5. An image processing device comprising:
an acquisition unit that acquires a read image generated by reading a receipt or a bill and including a special character having a size different from a basic size of a character;
a conversion unit that performs conversion processing on the size of the special character included in the read image into a size close to the basic size; and
a character recognition unit that performs character recognition processing on the conversion-processed read image, wherein
the character recognition unit performs the character recognition processing on the read image before the conversion processing, and among results of the character recognition processing on the read image before the conversion processing, replaces a portion different from the result of character recognition processing on the conversion-processed read image with a result of character recognition processing on the conversion-processed read image.

6. An image processing method comprising:
acquiring a read image generated by reading a receipt or a bill and including a special character having a size different from a basic size of a character;
setting character regions which are regions in a unit of character included in the read image;
performing conversion processing on the size of the special character included in the read image into a size close the basic size; and
performing character recognition processing on the conversion-processed read image, wherein
performing the conversion processing on a special character region which is a region of the special character in the character regions, and
in assumption that a most frequent value of any one width of the character regions in a vertical direction or in a horizontal direction is a reference width of the basic size, making a character region of the character regions of which any one width is different from the reference width as a target of the conversion processing, which is the special character region.

* * * * *